Sept. 3, 1929.  C. M. AHLENE  1,727,153

DRIVEN PLATE

Filed March 13, 1928

Inventor
Carl Martin Ahlene
By Wm O. Belt
Atty.

Patented Sept. 3, 1929.

1,727,153

UNITED STATES PATENT OFFICE.

CARL MARTIN AHLENE, OF CHICAGO, ILLINOIS, ASSIGNOR TO THE BORG & BECK COMPANY, OF CHICAGO, ILLINOIS, A CORPORATION OF ILLINOIS.

DRIVEN PLATE.

Application filed March 13, 1928. Serial No. 261,304.

This invention relates to friction clutches of the kind wherein a driven plate is interposed between two parts of a driving member and is adapted to be gripped or clamped by the parts under sufficient pressure to impart motion from the driving member to the driven member.

The object of the invention is to provide a driven plate of simple construction and having relatively and yieldingly movable parts whereby to permit the clutch to take hold smoothly, evenly and quickly and without setting up vibrations in the clutch and without carrying forward engine vibrations to the transmission.

In the accompanying drawings illustrating a selected embodiment of the invention:

Figure 1:
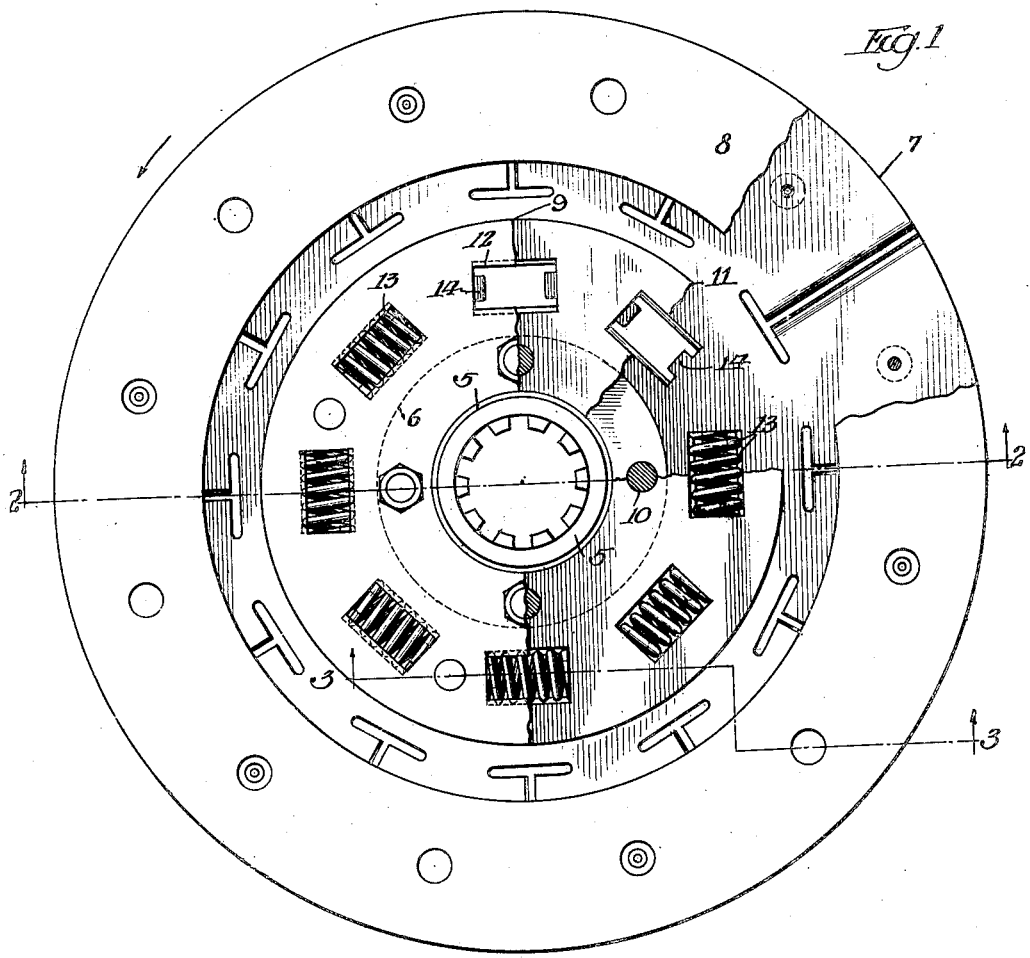
Fig. 1 is a side elevation of a driven plate, partly broken away, and partly in section.
Figure 2:
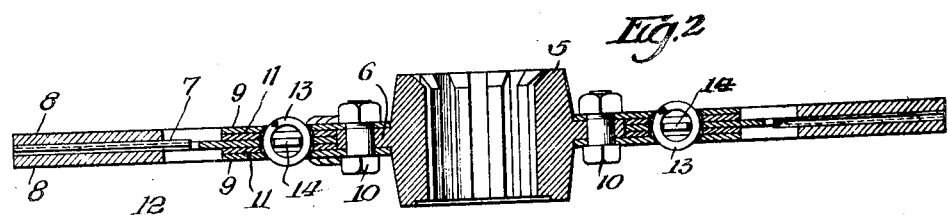
Fig. 2 is a sectional view on the line 2—2 of Fig. 1.
Figure 4:
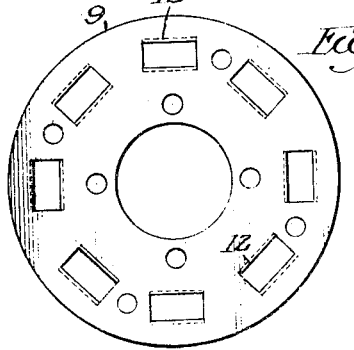
Fig. 4 is an elevation of one of the side plates on a reduced scale.
Figure 3:
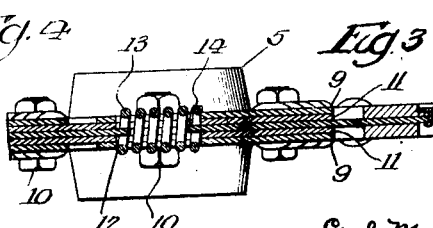
Fig. 3 is a sectional view on the line 3—3 of Fig. 1.

Referring to the drawings the driven plate comprises a friction member which is mounted upon a centrally disposed hub member, and coil springs are interposed between said members in a novel manner so that movement of the friction member is communicated through the spring cushion to the hub member without setting up vibrations in the clutch and without carrying forward engine vibrations to the transmission.

The hub member comprises a hub 5 having an integral peripheral flange 6. The friction member comprises a plate 7 which is mounted loosely on the hub flange 6 and is provided with friction facings 8. The friction plate member may be made as shown in Patent 1,659,289, February 14, 1928, or in any other suitable form. Side plates 9 overlap the flange 6 and the friction plate 7 and they are secured to the flange by bolts or rivets 10 which pass through the side plates and the flange. Filler plates 11 are loosely arranged on the flange 6 and are interposed between the friction plate and the side plates to provide a compact construction and arrangement of parts, prevent rattling and other noises and maintain a rigid assembly.

The friction plate, side plates and filler plates are provided with a plurality of elongated registering openings 12 arranged end to end, spaced apart, concentrically about the hub member. Each opening has parallel straight sides and is located between the inner and outer edges of the plates so that the openings are wholly enclosed within the marginal edges of the plates. Coil springs 13 are centrally disposed within said openings and they are held therein against displacement by retaining lugs 14 on the friction plate which project into the ends of the springs.

In practice the parts are assembled and the side plates are rigidly secured to the hub member by the bolts 10 to co-operate with the filler plates for maintaining the friction member in proper relation to the hub member. The springs are inserted in their seats in the openings 12 under a slight compression and the lugs 14 project into the ends of the springs sufficiently to retain the springs against displacement. The springs constitute a sectional cushion interposed between the friction member 7 and the hub member. The end walls of the openings are parallel and they constitute a substantial bearing extending entirely across the ends of the springs. When the friction member of the driven plate is gripped by the driving member of the clutch to travel in a direction indicated by the arrow on Fig. 1 the end walls at the rear ends of the openings in the friction plate member will compress the springs against the walls at the forward ends of the openings in the side plates which are rigidly secured to the hub flange and thereby motion is transmitted from the driving member of the clutch to the friction member and through the springs to the hub member. As the driven plate gains momentum the springs become centralized in the seat openings without setting up any vibration in the driven plate. This is due to the fact that the springs are compressed directly between end walls which are respectively a part of the friction member and a part of the hub member. And they are compressed only as and to the extent required for producing a movement of the hub member corresponding to the movement of the friction member. Furthermore the springs are seated in enclosed openings in the friction member and the hub member and the ends of the springs have a complete diametrical bearing against the friction member and the hub member so that they will not be distorted in service. The springs will always be free from those vibrations which tend to make a driven plate noisy because they are under a slight compression in their seat openings when the driven plate is at rest, and a movement of the friction member relative to the hub member compresses the springs and when the hub member gains the momentum of the friction member the springs simply centralize and are held against vibration by the force required to drive the driven plate. There is never any complete release of the springs even when changing between forward and reverse movement and therefore vibrations are not set up in the clutch. The springs also absorb engine vibrations and prevent them from passing on to the transmission.

The invention is simple but strong and substantial in construction and while I have shown it in a form which has been found satisfactory I would have it understood that I do not limit myself to this particular embodiment, but reserve the right to make all such changes as fairly fall within the scope of the following claims.

I claim:

1. A driven plate for friction clutches comprising a hub member and a friction member, said friction member being arranged on the hub member and said hub member comprising side plates which overlap the inner portion of the friction member, the overlapped parts of the friction member and the side plates having registering openings enclosed in each of said parts, and coil springs seated in said openings and forming a sectional spring cushion between the friction member and the hub member, the end walls of the openings in the friction member and the side plates of the hub member extending entirely across the ends of the springs.

2. A driven plate for friction clutches comprising a hub member and a friction member arranged in overlapping relation and provided in their overlapped parts with registering openings enclosed in each of said parts, coil springs seated in said openings and forming a sectional spring cushion between the friction member and the hub member, and lugs on the end walls of the openings in the friction member projecting into the ends of the springs.

3. A driven plate for friction clutches comprising a hub member having a peripheral flange and a pair of side plates securely fastened to opposite sides of the flange, a friction member loosely mounted on said flange and between said side plates, the overlapping parts of the side plates and the friction member having elongated registering openings enclosed in each of said parts, coil springs seated in said openings under compression and forming a sectional spring cushion between the friction member and the hub member, and lugs on the end walls of the openings in the friction member projecting into the ends of the springs, said end walls extending diametrically and entirely across the ends of the springs and the end walls of the side plates extending entirely across the ends of the springs alongside of the end walls of the friction member.

4. A driven plate for friction clutches comprising a hub member having a peripheral flange, side plates fastened to opposite sides of the flange, a friction member loosely arranged on said flange between said side plates, filler plates between the friction member and the side plates, said friction member, filler plates and side plates having registering openings enclosed in each of said parts, and coil springs seated in said openings under compression between the end walls thereof.

CARL MARTIN AHLENE.